C. Winegar,
Automatic Gate,
N° 13,445.   Patented Aug. 14, 1855.
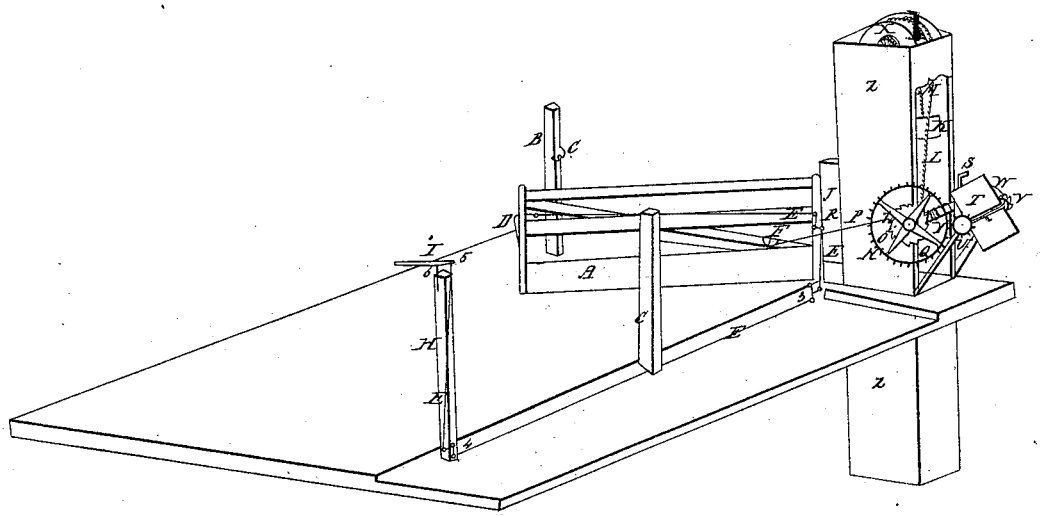
Witnesses;
Zechariah S. Winegar,
Samuel H. Winegar.
Inventor;
Caleb Winegar.

UNITED STATES PATENT OFFICE.

CALEB WINEGAR, OF UNION SPRINGS, NEW YORK.

DEVICE IN OPENING AND CLOSING GATES.

Specification of Letters Patent No. 13,445, dated August 14, 1855.

*To all whom it may concern:*

Be it known that I, CALEB WINEGAR, of Union Springs, in the county of Cayuga, in the State of New York, have invented a new and useful Improvement upon Winegar's Automaton Gate and Door Opener and Closer; and I do hereby declare that the following is a full, clear, and exact description of the construction and operation of the same, reference being had to the annexed drawing, making a part of this specification.

The said drawing represents a perspective view of the said machine with the improvements desired to be patented affixed to the same which said improvement I now describe.

N, represents a cog wheel, that is placed upon the shaft Y in the place of the driving crank in the original patented machine. U represents a pinion that meshes into said cog wheel N. T represents a fly or fan wheel on the shaft marked number 2, being on the same shaft with pinion U, and is driven by the said gear-wheels. The fan wheel T goes loose or turns on the shaft, and is driven by the ratchet wheel V which is fast on the shaft. And the spring catch W plays into the ratchet V and thus the fan is driven so that when the gate stops suddenly the fan runs on with its own momentum and does not add to the jar or shock. The benefit of this regulator will be readily perceived; it avoids all slam and jar and it enables you to run the gate much stronger and is the better enabled to encounter with winds and other impediments and it very much lessens the strain upon the machinery. It enables the machine to work safely iron gates, &c. Figure 1 represents where the pitman P is attached to the said wheel answering for a crank as well as a driving wheel to the fan wheel. The cog wheel N slips in the same manner, that the crank slips in said original machine, and the said wheel and gate are driven by the ratchet wheel O that is attached firmly to the shaft Y, the spring catch Q, which is attached to the said cog-wheel playing into said ratchet wheel and drives the gate fan and all.

S represents the crank that winds up the machine which operates the same as in the original machine. By this arrangement it will be seen that when the machine is being wound up the machine all remains stationary.

The box Z that holds the machinery is set into the ground as indicated in the drawing and the weight descends to the bottom of it. The pitman P is attached at the gate at F by means of a projecting adjustable lever, and when the gate is closed it stands parallel with the gate. The weight is applied to run the gate without gear—as in the original. The pulley X is used. The weight is wound upon the small end of the said pulley and the cord that runs the shaft Y winds up the large end of it. Thus the motion is increased without gear. In the drawing the wire E connects with the spring catch D in the same way as in the original machine and carried to the elbow R in the same way from the elbow R it is carried down to the double elbow, 3, and thence conducted in a tubular inclosure under ground and out of sight along to elbow, 4, and from thence up by or through the port H to the end of the lever at 5. Another wire attaches to the elbow, 3, and connects in the same manner with the lever a, the post on the opposite side of the fence which is omitted for want of room in the drawing. By this means I avoid the unsightly appearance of the high posts in the original machine and when properly secured less liable to get out of repair.

The lever, I, is fastened to the iron 6, in such a manner that it is free to work up and down and the iron 6 is put into a socket in the post in such a way that it permits the lever I to be pushed backward and forward horizontally without injury to any part, so that in case it should be run against by a carriage it simply turns out of the way and when passed returns to its right position.

What I claim as my invention and improvement and desire to secure by Letters Patent is—

The fan wheel T and shaft, 2, the cog-wheel N, the ratchet wheel V and spring catch W as applied to said machine; all else I disclaim in this patent as having been patented by me in said original machine, date of patent May 29th, 1855; and held by me under said patent, not intending in these claims to limit myself to the precise arrangement of the parts herein described but to vary the same at pleasure while I attain the same ends by means substantially the same.

CALEB WINEGAR.

Witnesses:
ZECHARIAH S. WINEGAR,
SAMUEL K. WINEGAR.